(12) United States Patent
Nagai

(10) Patent No.: US 7,240,775 B2
(45) Date of Patent: Jul. 10, 2007

(54) SHOCK ABSORBER

(75) Inventor: Takayuki Nagai, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 276 days.

(21) Appl. No.: 11/042,346

(22) Filed: Jan. 26, 2005

(65) Prior Publication Data

US 2005/0178624 A1 Aug. 18, 2005

(30) Foreign Application Priority Data

Feb. 3, 2004 (JP) ............................. 2004-026186

(51) Int. Cl.
*F16F 9/32* (2006.01)
(52) U.S. Cl. ...................... 188/300; 188/266
(58) Field of Classification Search ............... 188/288, 188/300
See application file for complete search history.

(56) References Cited

U.S. PATENT DOCUMENTS

| | | | | |
|---|---|---|---|---|
| 4,424,980 A | * | 1/1984 | Tsukamoto et al. | ......... 280/276 |
| 4,561,669 A | * | 12/1985 | Simons | ...................... 280/276 |
| 4,852,703 A | * | 8/1989 | Nishimoto | .................. 188/284 |
| 4,880,213 A | * | 11/1989 | Shinbori et al. | ......... 267/64.27 |
| 4,964,625 A | * | 10/1990 | Kawamura | .................. 267/221 |
| 6,199,672 B1 | * | 3/2001 | Wada et al. | ........... 188/322.12 |
| 6,234,505 B1 | * | 5/2001 | Ito | .............................. 280/276 |
| 6,568,664 B2 | * | 5/2003 | Furuya | ..................... 267/64.26 |
| 6,910,559 B2 | * | 6/2005 | Wada | .................... 188/322.12 |
| 6,997,293 B2 | * | 2/2006 | Tomonaga et al. | .......... 188/315 |
| 2005/0133320 A1 | * | 6/2005 | Fujita et al. | ................ 188/297 |

FOREIGN PATENT DOCUMENTS

| | | | |
|---|---|---|---|
| JP | 06147251 A | * | 5/1994 |
| JP | 06-173999 | | 6/1994 |
| JP | 2001-280399 | | 10/2001 |
| JP | 2001-330073 | | 11/2001 |
| JP | 2005076707 A | * | 3/2005 |
| JP | 2006029430 A | * | 2/2006 |

* cited by examiner

*Primary Examiner*—Robert A. Siconolfi
(74) *Attorney, Agent, or Firm*—Rabin & Berdo, PC

(57) ABSTRACT

A shock absorber of a built-in damper type is provided with a rod guide portion one end of which is fixed to an end of a cylinder for a damper, the rod guide portion slidably supporting a rod, and an oil lock piece disposed in the other end of the rod guide portion, the oil lock piece and an oil lock case defining an oil lock chamber filled with an operating oil at the maximum compression state of the shock absorber, wherein the rod guide portion is provided with an oil seal in a side of the rod to prevent outflow of the operating oil from the inside of the cylinder, and a seal ring in a side of the rod to control leakage of the operating oil from the oil lock chamber based upon the pressure of the operating oil in the oil lock chamber.

8 Claims, 4 Drawing Sheets

B-B

SHOCK ABSORBER

BACKGROUND OF THE INVENTION

1. Field of the Invention

The present invention relates to a shock absorber, and in particular, to a shock absorber of a built-in damper type provided with an oil lock structure, which can achieve a desired oil lock effect and prevent flaws of an oil seal caused by a high pressure function.

2. The Related Art of the Invention

For example, Japanese Unexamined Patent Publication No. 6-173999 has disclosed the technology with respect to a conventional shock absorber of a built-in damper type provided with an oil lock structure.

The conventional shock absorber is provided with an outer tube, and an inner tube located inside the outer tube and fixed to a lower end member of the shock absorber where the outer tube and the inner tube are arranged to slide with each other and a damper is disclosed inside them. The damper slides while the inner tube slides on an inner surface of the outer tube, to produce a damping force. When the shock absorber is at the maximum compression state, an oil lock piece provided in a cylinder of the damper enters into an oil lock case located in an end of the inner tube. The entering of the oil lock piece into the oil lock case causes the volume inside oil lock case to reduce, increasing the pressure therein. Based upon this pressure increase, a predetermined oil lock effect is achieved.

Meanwhile, an oil chamber is provided between the oil lock piece and a rod guide in this technology. A highly pressurized operating oil at the oil lock state does not act on the oil chamber due to the action of the oil lock piece. Accordingly the high pressure does not exert on an oil seal provided in the lock guide. Further, a communicating bore communicating between the oil chamber and an outside thereof is provided in the cylinder. In case the highly pressurized operating oil enters into the oil chamber caused by wear of the oil lock piece or the like, the communicating bore is arranged to discharge the highly pressurized operating oil from the oil chamber to the outside thereof, protecting the rod guide provided with the oil seal from the highly pressurized operating oil.

According to the conventional technology, when the highly pressurized operating oil enters into the oil chamber, the highly pressurized operating oil is released to the outside thereof, thereby protecting the oil seal. The oil lock piece, however, allows a predetermined clearance for securing slide performance of the piston rod.

Namely, according to the conventional oil lock structure, flow of the highly pressurized operating oil passing through the clearance provided in the oil lock piece portion is designed to be allowed. An oil lock effect, however, is achieved by enclosing an operating oil inside the oil lock chamber defined between the oil lock piece and the oil lock case. Therefore, since in the conventional oil lock structure, a leakage of the highly pressurized operating oil from the oil lock chamber is allowed, the conventional oil lock structure results in that a predetermined oil lock effect can not be achieved.

In view of the above, there exists a need for a shock absorber which overcomes the above-mentioned problems in the related art. The present invention addresses this need in the related art and also other needs, which will become apparent to those skilled in the art from this disclosure.

SUMMARY OF THE INVENTION

It is an object of the present invention to provide a shock absorber with an oil lock structure, which can maintain a desired oil lock effect and prevent flaws of an oil seal caused by a high pressure function.

According to a first aspect of the present invention, a shock absorber comprises, an outer tube, an inner tube slidably disposed inside the outer tube, a cylinder disposed inside the inner tube, a rod entering inside the inner tube, a piston disposed in a front end of the rod to slide on an outer surface of the cylinder, wherein the piston defines two chambers with the cylinder for producing a damping force, a rod guide portion one end of which is fixed to an end of the cylinder, slidably supporting the rod, an oil lock case disposed in an end of the inner tube, and an oil lock piece disposed in the other end of the rod guide portion, wherein an oil lock chamber is formed by the oil lock piece and the oil lock case, being filled with an operating oil when the shock absorber is at the maximum compression state, to restrict a stroke of the shock absorber, wherein the rod guide portion comprises, an oil seal disposed in a side of the rod for preventing flow of the operating oil from the cylinder, and a seal ring to alleviate an influence of the operating oil at a high pressure in the oil lock chamber on the operating oil inside the cylinder in accordance with the pressure of the operating oil in the oil lock chamber, wherein when the shock absorber is at the maximum compression state, the operating oil at the high pressure in the oil lock chamber is sealed by the seal ring to prevent the operating oil at the high pressure in the oil lock chamber from acting on the oil seal.

The rod guide portion may comprise a concave-shaped circular groove formed in a side of the rod to dispose the seal ring, wherein a diameter of the circular groove is greater than an outer diameter of the seal ring.

A case may be disposed on an inner surface of the rod guide portion to position the oil seal between the rod and the case, wherein the seal ring is disposed under a lower end of the case, and the seal ring is pressed against a lower end face of the case when the shock absorber is at the maximum compression state so that an operating oil at a high pressure in the oil lock chamber does not exert on the oil seal.

A bearing may be provided between the case and the rod and between the oil seal and the seal ring, wherein the case comprises a wall for preventing the oil seal from contacting the bearing.

A positioning member may be disposed on an outer surface of the rod guide portion to restrict an upward travel of the oil lock piece, and a stop ring may be disposed at a lower side of the rod guide portion on the outer surface thereof to stop a downward travel of the oil lock piece.

The positioning member may be positioned by a shoulder of the rod guide portion and a stop ring engaged to the rod guide portion.

The oil lock piece may include concave portions formed in an inner surface thereof, each concave portion spaced in the sliding direction by a predetermined interval for flow of the operating oil, and semi-circular notch portions formed in the radial direction in a lower end face of the oil lock piece, the notch portions being communicated with the concave portions, wherein at the maximum compression state of the shock absorber, the oil lock piece slides to the upward side due to the pressure in the oil lock chamber, to contact the positioning member for closing the concave portions to prevent the oil flow from the oil lock chamber.

An aperture may be formed in the rod guide portion, and the operating oil enters into the oil lock chamber through the aperture to provide a smooth stroke of the shock absorber from the maximum compression state to the expansion state.

Advantages of the Invention

According to a shock absorber of the present invention, an oil lock structure is so provided that when the shock absorber is at the maximum compression state, a desired oil lock effect can be achieved, while wear of an oil seal caused by high pressure function can be prevented.

These and other objects, features, aspects and advantages of the present invention will become apparent to those skilled in the art from the following detailed description, which, taken in conjunction with the annexed drawings, discloses preferred embodiment of the present invention.

BRIEF DESCRIPTION OF THE DRAWINGS

The preferred embodiment according to the invention will be explained below referring to the drawings, wherein.

DETAILED DESCRIPTION OF THE PREFERRED EMBODIMENT

The selected embodiment of the present invention will now be explained with reference to the drawings. It will be apparent to those skilled in the art from this disclosure that the following description of the embodiment of the present invention is provided for illustration only, and not for the purpose of limiting the invention as defined by the appended claims and their equivalents.

Figure 1:
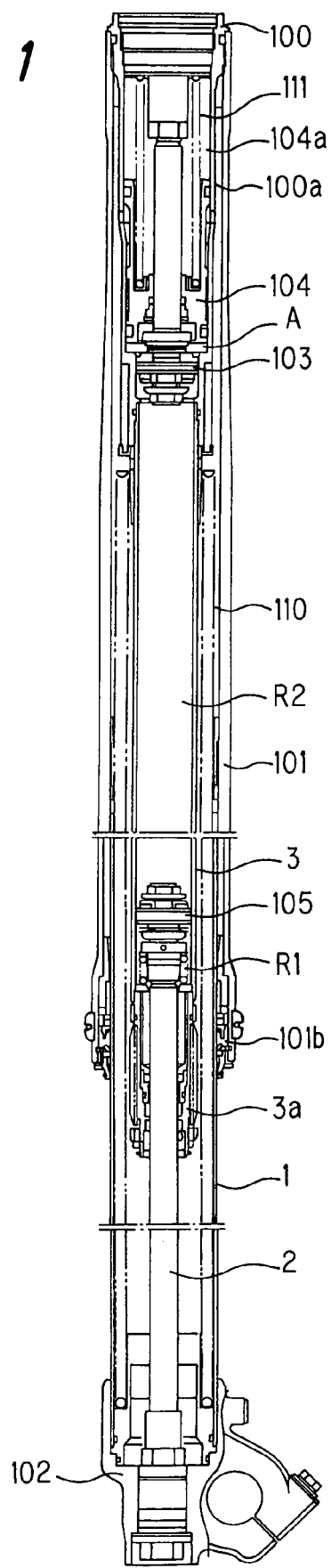
FIG. 1 is a view showing an entire shock absorber with an oil lock structure in a preferred embodiment of the present invention.

FIG. 1 is a construction view showing a shock absorber of a built-in damper type to which the present invention is applied. This shock absorber is a shock absorber of a so-called upside-down type.

In the shock absorber, an outer tube 101 enclosed by an upper end member 100 is fixed to a side of a vehicle body, and on the other hand, a lower end member 102 is fixed to a side of an axle. The shock absorber is provided with the outer tube 101 fixed to the upper end member 100 and an inner tube 1 fixed to the lower end member 102. The inner tube 1 is slidably located inside the outer tube 101. An operating oil and an gas are filled in the inner tube 1 and the outer tube 101. An oil seal 101b is provided in a lower end of the outer tube 101 for preventing a leakage of the operating oil from a clearance between the outer tube 101 and the inner tube 1.

The upper end member 100 includes a cylindrical portion 100a which is disposed inside the outer tube 101 and extends in the lower side thereof. A cylinder 3 is disposed in a tip end of the cylindrical portion 100a. Herein the cylinder 3, the inner tube 1, and the outer tube 101 are disposed co-axially. A spring 110 is disposed between the cylinder 3 and the inner tube 1.

A base valve 103 is fixed to an inner side of the cylindrical portion 100a of the upper end member 100. A free piston 104 is slidably disposed above the base valve 103, and a gas chamber 104a is defined with a space between the free piston 104 and the upper end member 100. A spring 111 is disposed in the gas chamber 104a, urging the free piston 104 in the lower direction. A space A between the base valve 103 and the free piston 104 is filled with an operating oil passing through the base valve 103. A position of the free piston 104 is determined by balance between pressure of the operating oil in the space A and an urging force of the spring 111.

A base of a rod 2 is fixed to the lower end member 102, and a tip end of the rod 2 extends inside the cylinder 3. A piston 105 is fixed to the tip end of the rod 2, and the piston 105 slidably contacts an inner surface of the cylinder 3. The piston 105 divides the inside of the cylinder 3 into a lower oil chamber R1 and an upper oil chamber R2. An operating oil is filled in the two oil chambers R1 and R2 of the cylinder 3. The operating oil in the upper oil chamber R2 enters through the base valve 103 into the space A. And the piston 105 travels caused by a relative movement between the inner tube 1 and the outer tube 101. The travel of the piston 105 causes occurrence of a predetermined damping force. A rod guide portion 3a is disposed in a lower end of the cylinder 3. The rod guide portion 3a slidably supports the rod 2, as well as limits flow of an operating oil to be described later.

Meanwhile, the travel of the piston 105 causes variation in a volume inside the cylinder 3. For example, when the piston 105 travels in the upward direction, a volume of the upper oil chamber R2 is reduced corresponding to an increase amount of an entering volume of the rod 2 into upper oil chamber R2 of the cylinder 3. This volume variation amount is allowed by such a way that the operating oil in the upper oil chamber R2 passes through the base valve 103 into the space A between the base valve 103 and the free piston 104, and as a result, the free piston 104 travels in the upward side, to increase the volume of the space A.

Figure 2:
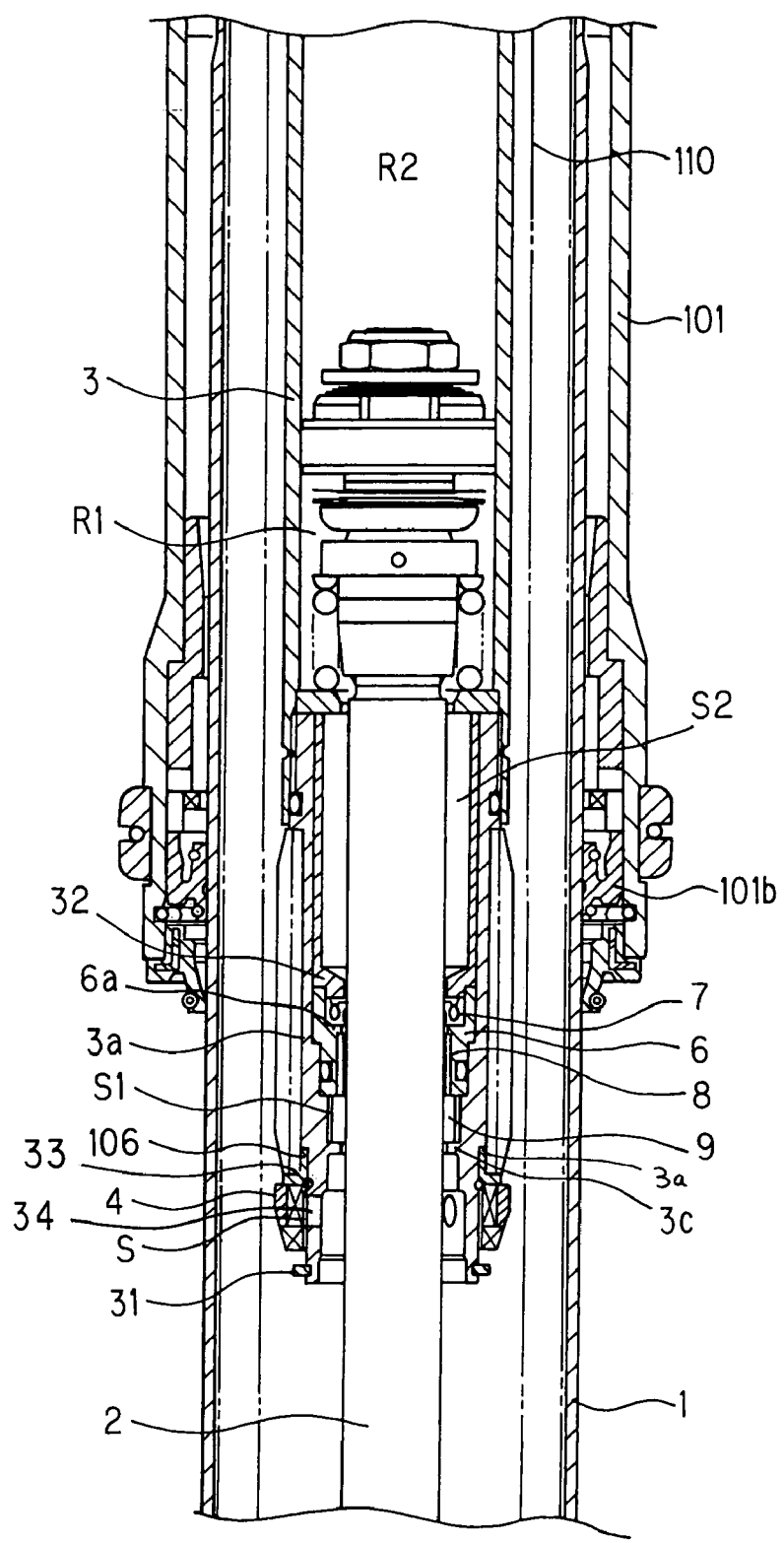
FIG. 2 is a cross sectional view showing an operating state of the oil lock structure in the preferred embodiment of the present invention.

An oil lock structure of the present invention will be explained with reference to FIGS. 2 and 3.

The oil lock structure of the present invention is provided with the rod guide portion 3a fixed to the lower end of the cylinder 3 and an oil lock case 5 formed integrally with the lower end member 102. The oil lock case 5 is disposed between the rod 2 and the inner tube 1. The rod guide portion 3a is formed in a hollow shape for slidably supporting the rod 2, and a space S2 is formed between the rod 2 and the rod guide portion 3a. A circular partition wall 3c extending from an inner wall of the rod guide portion 3a to a side of the rod 2 is formed in the rod guide portion 3a. And an oil seal 7, a bearing 8, and a seal ring 9 are provided in the space S2 between the rod 2 and the rod guide portion 3a. They are disposed in order of the oil seal 7, the bearing 8, and the seal ring 9 from the side of the piston 105 to the partition wall 3c. Note that the bearing 8 and the oil seal 7 are supported and assembled in advance by a case 6, and accordingly an assembly workability of a shock absorber improves. And the oil seal 7, the bearing 8, and the seal ring 9 are pressed against the partition wall 3c by a stopper 32 and supported by the rod guide portion 3a.

The oil seal 7 has a U-shaped cross section and is so arranged that a lip portion 7a thereof directed upwards slides and contacts on an outer surface of the rod 2. The oil pressure in the lower oil chamber R1 inside the cylinder 3 exerts on the lip portion 7a and the oil seal 7 prevents the operating oil in the lower oil chamber R1 from flowing out to a side of the bearing 8.

The bearing 8 slidably contacting the rod 2 is provided with a bush 81 made of a material with a good lubricating property. The bush 81 is composed of Teflon (registered trademark) or the like. The bush 81 supports the rod 2 through an oil film of the operating oil and reduces friction resistance with the rod 2 at the time of the sliding of the rod 2. Note that the case 6 is provided with a dividing wall 6a between the oil seal 7 and the bearing 8. Therefore, even if the bearing 8 slides in the direction of the oil seal 7, the dividing wall 6a structurally prevents the bearing 8 from contacting the oil seal 7. Accordingly, flaws of the oil seal 7 due to the contacting of the bearing 8 with the oil seal 7 can be avoided.

The seal ring 9 is slidably disposed on the rod 2. And an outer diameter of the seal ring 9 is smaller than a diameter of a concave-shaped circular groove 3d for disposition of the seal ring 9, to produce a predetermined clearance S1.

The seal ring 9 thus slides and contacts on the rod 2, as well as the outer diameter portion of the seal ring 9 is formed to produce the predetermined clearance S1 between the outer diameter portion of the seal ring 9 and the rod guide portion 3a. This clearance S1 allows the movement of the seal ring 9 in the radial direction. Accordingly, for example, even in case an axial center of the rod 2 does not correspond to an axial center of the rod guide portion 3a, a smoothly sliding state between the rod 2 and the rod guide portion 3a can be maintained. In the event the high pressure is applied on the seal ring 9, an upper end face of the seal ring 9 thus contacts a lower end face of the case 6, to prevent the operating oil flowing through the clearance S1 from acting on the back face of the oil seal 7.

An oil lock piece in a ring shape 4 is slidably provided in an outside of the lower end of the rod guide portion 3a. A sliding amount of the oil lock piece 4 is regulated by a stop ring 31 fixed to an outer portion of the rod guide portion 3a and a positioning member 106. The positioning member 106 is positioned by a shoulder 3b of the rod guide portion 3a and a stop ring 33 engaged to the rod guide portion 3a.

An inner diameter of the oil lock piece 4 is formed to be greater by a predetermined dimension than an outer diameter of the rod guide portion 3a, and the operating oil flows through the clearance S formed based upon the difference in dimension.

Figure 3:
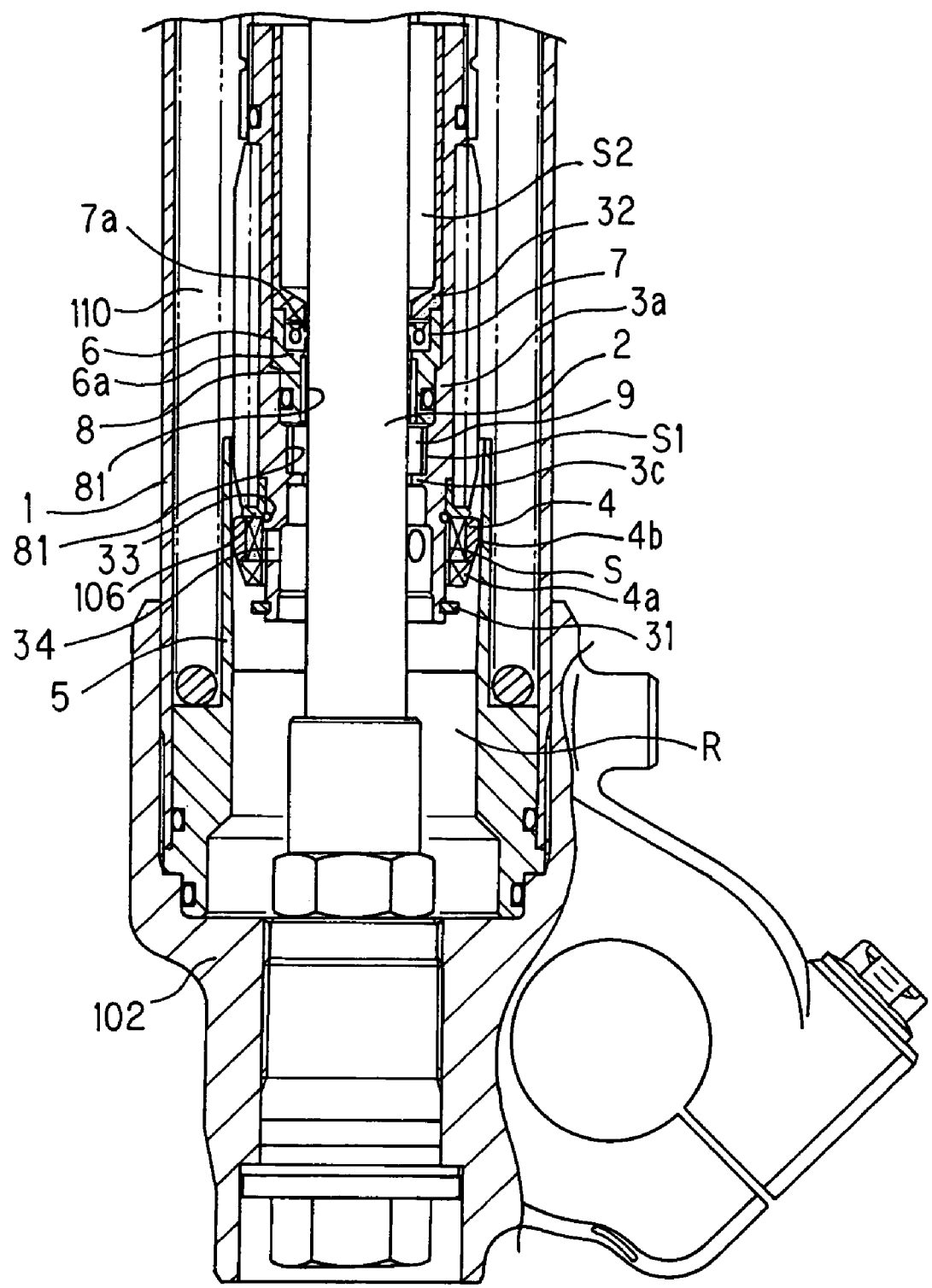
FIG. 3 is a cross sectional view showing the oil lock structure when a shock absorber is at the maximum compression state in the preferred embodiment of the present invention.

FIG. 3 shows a state in the vicinity of the oil lock piece 4 when the shock absorber 1 is at the maximum compression state. In this state, an outer surface 4b of the oil lock piece 4 travels inside the inner surface of the oil lock case 5 fixed to the lower end member 102, to produce a circular clearance between the oil lock case 5 and the oil lock piece 4. And as a result, an oil lock chamber R is defined between the oil lock case 5 and the oil lock piece 4 to enclose the operating oil therein.

The oil lock case 5 is a circular member extending upwards, so that when the oil lock piece 4 travels down inside the inner surface of the oil lock case 5, an orifice as the circular clearance is formed between the inner surface of the oil lock case 5 and the outer surface of the oil lock piece 4.

The oil lock case 5 is configured to have an inner diameter which becomes gradually larger toward the upper side. And an outer diameter of the outer surface 4b of the oil lock piece 4 is formed to be smaller than an upper-side inner diameter of the oil lock case 5. Namely when the oil lock piece 4 begins to enter into the oil lock case 5, the operating oil in the oil lock chamber R flows out from the circular clearance as the difference between the outer diameter of the oil lock piece 4 and the inner diameter of the oil lock case 5. Since the clearance becomes gradually smaller as the oil lock piece 4 further enters down into the inside of the oil lock case 5, the pressure in the oil lock chamber R is gradually increased, whereby a rapid pressure increase thereof can be avoided.

Figure 4:
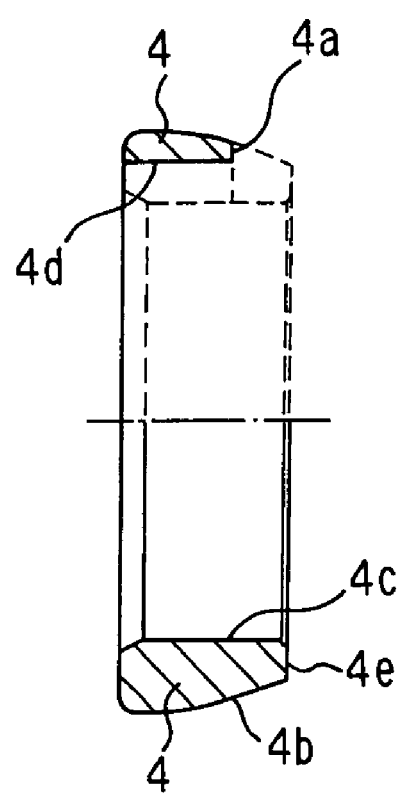
FIG. 4 is a view showing a detailed shape of an oil lock piece in the preferred embodiment of the present invention.
Figure 4:
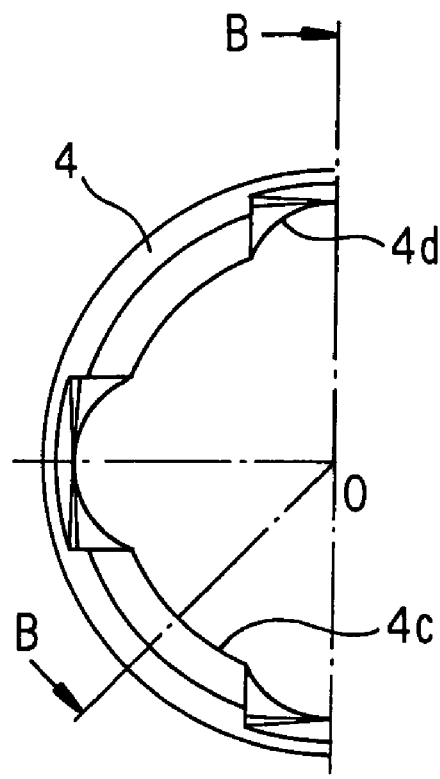

As shown in FIG. 4, concave portions 4d are formed on an inner surface 4c of the oil lock piece 4, each spaced in the sliding direction by a predetermined interval. Accordingly, the operating oil flows through the concave portions 4d. Semi-circular notch portions 4a are formed in the radial direction on the lower end face 4e of the oil lock piece 4. The notch portions 4a are communicated with the concave portions 4d.

The flow of the operating oil at the time of the maximum compression state of the shock absorber 1 shown in FIG. 3 will be explained. At the time of the maximum compression state of the shock absorber 1, the oil lock piece 4 slides toward the upward side due to the pressure in the oil lock chamber R, to contact the positioning member 106. As a result, the concave portions 4d are closed by the positioning member 106 to prevent the oil flow from the oil lock chamber R. And further, the clearance between the outer surface of the oil lock piece 4 and the inner surface of the oil lock case 5 becomes small to restrict the flow of the operating oil. By such a way, the sliding of the shock absorber 1 in the compression direction is stopped. Then, when the shock absorber 1 moves in the expansion direction away from the maximum compression state, the rod guide portion 3a travels upwards relative to the oil lock piece 4, and then, the oil lock piece 4 contacts the stop ring 31. As a result, the clearance between the oil lock piece 4 and the positioning member 106 is produced. The operating oil flows into the oil lock chamber R through this clearance, the concave portions 4d, the notch portions 4a, and apertures 34 formed in the rod guide portion 3a, providing a smooth stroke of the shock absorber 1 from the maximum compression state.

During the time of the maximum compression state of the shock absorber 1 when the oil lock piece 4 thus travels inside the oil lock case 5, the flow of the oil in the oil lock chamber R is limited by the oil lock piece 4. Therefore, the pressure of the operating oil in the oil lock chamber R is increased. The increased pressure of the operating oil acts on the seal ring 9 to slide the seal ring 9 upward for contact with the case 6. Accordingly, the high pressure of the operating oil in the oil lock chamber R does not act on the back face of the oil seal 7.

As a result, even in case the oil pressure in the oil lock chamber R increases, the high pressure in the oil lock chamber R is reduced by the seal ring 9, thereby to prevent the high pressure from acting on the oil seal 7. Therefore, there is no possibility that deformation or movement of the oil seal 7 occurs caused by the high pressure of the operating oil to deteriorate sealing performance thereof. And since the high pressure in the oil lock chamber R does not act on the oil seal 7, the lip portion 7a of the oil seal 7 does not enter into the clearance between the stopper 32 and the rod 2, to prevent damages of the lip portion 7a.

This application claims priority to Japanese Patent Application No. 2004-026186. The entire disclosure of Japanese Patent Application No. 2004-026186 is hereby incorporated herein by reference.

While only the selected embodiment have been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A shock absorber, comprising:
an outer tube;
an inner tube slidably disposed inside the outer tube;
a cylinder disposed inside the inner tube;
a rod entering inside the cylinder;
a piston disposed in a tip end of the rod to slide on an inner surface of the cylinder, wherein the piston defines two chambers with the cylinder for producing a damping force;
a rod guide portion, one end of which is fixed to an end of the cylinder, slidably supporting the rod;
an oil lock case disposed in an end of the inner tube; and
an oil lock piece disposed in the other end of the rod guide portion,
wherein:
an oil lock chamber is formed by the oil lock piece and the oil lock case, the oil lock chamber being filled with an operating oil when the shock absorber is at the maximum compression state to restrict a stroke of the shock absorber,
wherein:
the rod guide portion comprises:
an oil seal disposed in a side of the rod for preventing flow of the operating oil from the cylinder; and
a seal ring to alleviate an influence of the operating oil at a high pressure in the oil lock chamber on the operating oil inside the cylinder in accordance with the pressure of the operating oil in the oil lock chamber,
wherein:
when the shock absorber is at the maximum compression state, the operating oil at the high pressure in the oil lock chamber is sealed by the seal ring to prevent the operating oil at the high pressure in the oil lock chamber from acting on the oil seal, and
an expansion-direction motion of the shock absorber away from the maximum compression state produces a clearance between the oil lock piece and the rod guide portion, whereby the operating oil flows into the oil lock chamber through the clearance.

2. The shock absorber according to claim 1, wherein:
the rod guide portion comprises:
a concave-shaped circular groove formed in a side of the rod to dispose the seal ring, wherein:
a diameter of the circular groove is greater than an outer diameter of the seal ring.

3. The shock absorber according to claim 2, further comprising:
a case disposed on an inner surface of the rod guide portion to position the oil seal between the rod and the case, wherein:
the seal ring is disposed under a lower end of the case, and
the seal ring is pressed against a lower end face of the case when the shock absorber is at the maximum compression state so that an operating oil at a high pressure in the oil lock chamber does not exert on the oil seal.

4. The shock absorber according to claim 3, further comprising:
a bearing provided between the case and the rod and between the oil seal and the seal ring, wherein:
the case comprises a wall for preventing the oil seal from contacting the bearing.

5. The shock absorber according to claim 4, further comprising:
a positioning member disposed on an outer surface of the rod guide portion to restrict an upward travel of the oil lock piece, and
a stop ring disposed at a lower side of the rod guide portion on the outer surface thereof to stop a downward travel of the oil lock piece.

6. The shock absorber according to claim 5, wherein:
the positioning member is positioned by a shoulder of the rod guide portion and a stop ring engaged to the rod guide portion.

7. The shock absorber according to claim 5, wherein:
the oil lock piece includes:
concave portions formed in an inner surface thereof, each concave portion spaced in the sliding direction by a predetermined interval for flow of the operating oil; and
semi-circular notch portions formed in the radial direction in a lower end face of the oil lock piece, the notch portions being communicated with the concave portions, wherein:
at the maximum compression state of the shock absorber, the oil lock piece slides to the upward side due to the pressure in the oil lock chamber, to contact the positioning member 106 for closing the concave portions to prevent the oil flow from the oil lock chamber.

8. The shock absorber according to claim 7, wherein:
an aperture is formed in the rod guide portion; and
the operating oil enters into the oil lock chamber through the aperture to provide a smooth stroke of the shock absorber from the maximum compression state to the expansion state.

* * * * *